May 13, 1947.        J. L. BORIFF        2,420,348
NAVIGATION INSTRUMENT
Filed March 27, 1944        2 Sheets-Sheet 1
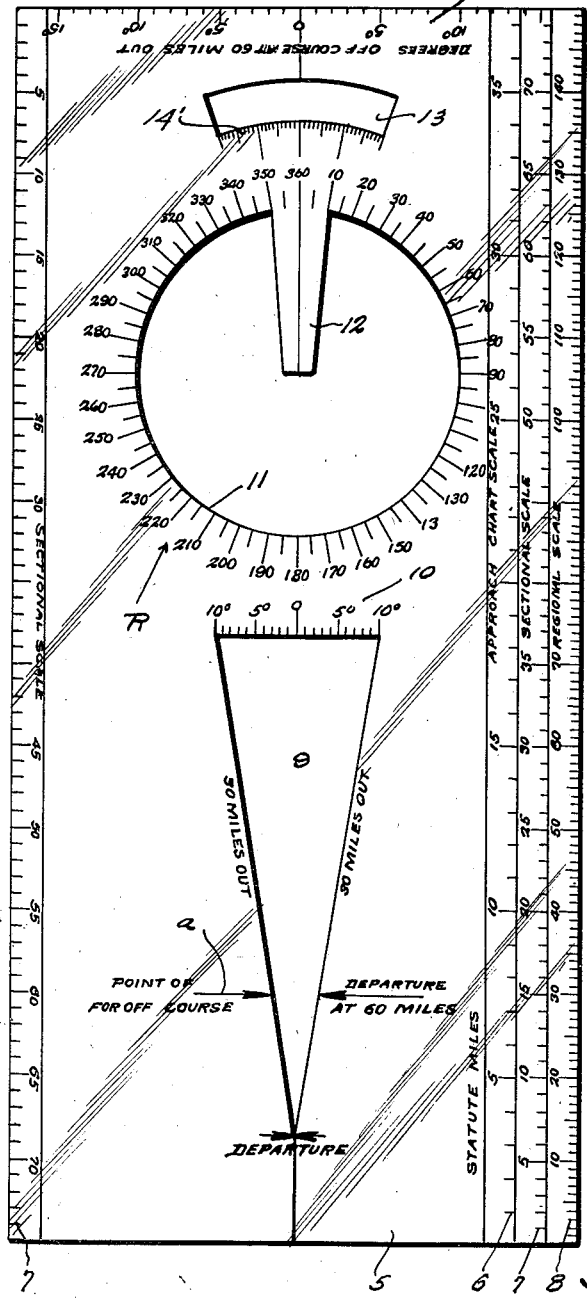
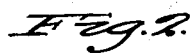
Inventor
Jewel Lane Boriff,
By Clarence A. O'Brien
and Harvey B. Jacobson
Attorney.

Patented May 13, 1947

2,420,348

UNITED STATES PATENT OFFICE 2,420,348

NAVIGATION INSTRUMENT

Jewell Lane Boriff, New Braunfels, Tex.

Application March 27, 1944, Serial No. 528,277

2 Claims. (Cl. 33—104)

This invention relates to a navigation instrument particularly useful to aviators and adapted for use in readily measuring the distance between the point of departure and the destination of a trip, for determining the direction or angle of the course followed in the trip, and for aiding in construction of lines for estimation of drift or degrees off course.

An important object of the present invention is to provide an instrument of the above kind which will aid in the construction of lines and angles used in solution of navigation problems, such as lines used in the solution of wind vector problems.

A further object of the present invention is to provide an instrument of the above kind which is decidedly simple in construction, efficient, easy to use, and devoid of separate or movable parts.

The exact nature of the present invention, as well as specific features thereof, will become apparent from the following description when considered in connection with the accompanying drawings.

In the drawings, wherein like reference characters indicate corresponding parts throughout the several views:

Figure 1 is a plan view of a navigation instrument embodying the present invention.

Figure 2 is a central longitudinal sectional view thereof.

Figure 3:
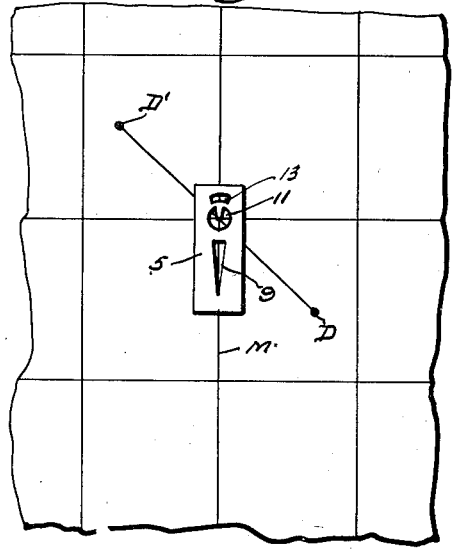
Figure 3 is a diagrammatic plan view illustrating one manner of using the instrument for determining the direction or angle of course.

Referring in detail to the drawings, the present instrument consists of a rectangular elongated sheet of suitable stiff material, indicated at 5, said sheet having side longitudinal scales 6, 7 and 8 respectively graduated to cover 4 miles to the inch, 8 miles to the inch, and 16 miles to the inch. These scales are respectively adapted for cooperation with similarly scaled approach, sectional and regional maps. As shown, these scales may be provided along one side of the sheet, while an additional sectional map scale 7 may also be provided along the opposite side of the sheet. Formed in the sheet 5 near one end of the latter is a triangular opening 9 elongated longitudinally of the sheet and disposed between the sides of the latter. The inner end of the opening constitutes the base of the triangle and has a length of 10° to either side of the longitudinal center line of the triangular opening and the sheet. Along the base of the triangle formed by this opening are graduations 10 indicating the degrees to either side of the center line. Also, the longitudinal or side lines defined by the sides of the triangle are of a length equal to 30 miles on a sectional scale or map. Thus, figuring from the apex of the triangle and using said apex as the point of departure, the scale 10 may be utilized to determine the degrees off course 30 miles out from the point of departure.

A similar scale 10a is provided along the opposite end of the sheet 5, and at opposite sides of the triangular opening 9 near the apex of the latter are arrows a the point intermediate of which constitutes a point of departure when the scale 10a is utilized to determine the degrees off course 60 miles from the point of departure, as figured on a sectional scale or map.

At a point between the opening 9 and the most remote end of the sheet 5, the latter is formed with a compass rose R which is fixed and defined by graduations in degrees from 0 to 360° about a circular opening 11 provided centrally between the sides of the sheet 5. This opening is relatively large and has a reentrant arm 12 projecting from the top thereof to the center of the opening 11, the longitudinal center of said arm coinciding with the longitudinal center of the sheet 5 and the opening 9.

Also, the sheet has an arcuate slot 13 therein adjacent to and concentric with the compass rose R, and at the side of the latter from which the arm 12 projects. Degree graduations 14' are provided along the inner edge of slot 13, and the latter extends about 15° to either side of a line coincident with the longitudinal axis of arm 12. This arm obscures the edge of the compass rose for about 30°, making it impossible to read the course line for that distance on the edge of the compass rose. By means of the graduated slot 13, the course line may be read directly at this part of the instrument. Accuracy in the construction of lines and angles is had because the pencil point can be placed close to the graduated lines, avoiding the effect of parallax.

Figure 4:
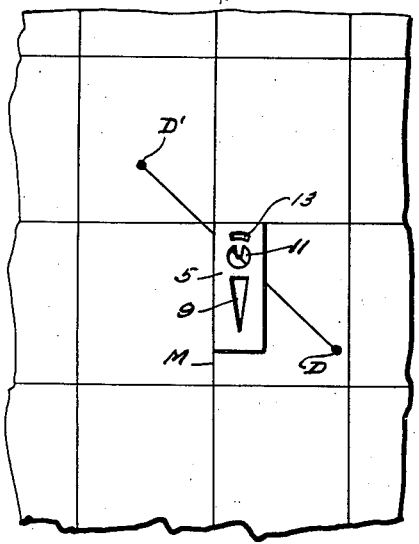
Figure 4 is a similar view showing another manner of so using the instrument.
Figure 5:
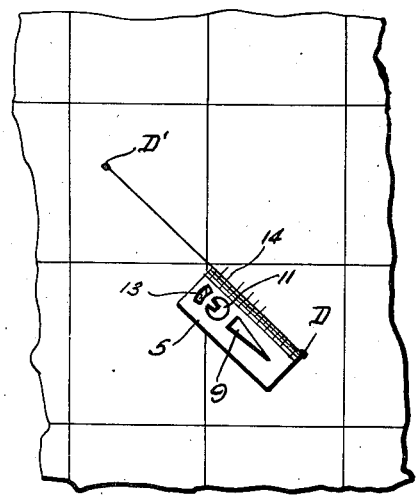
Figure 5 is a view similar to Figure 3 showing the manner of using the instrument for measuring distance covered by the course.
Figure 6:
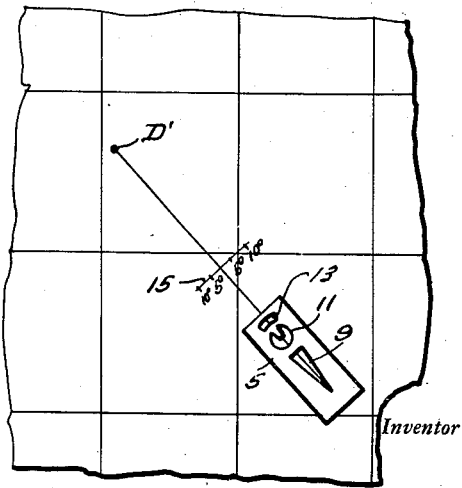
Figure 6 is a still further similar view illustrating the manner of using the instrument to aid in construction of lines for estimation of drift or degrees off course.

To state the use of the invention in another way, the device is adapted for measuring the angle of direction of a course on an aeronautical chart; for measuring mileage on a sectional, regional or approach chart of a series of aeronautical charts; and for constructing additional lines on the chart to aid in the estimation of drift during flight. The invention embodies a compass rose with a central cut-out area to allow reading of angles; a series of scales consisting of a sectional scale of 8 miles to the inch, a regional scale of 16 miles to the inch and an approach scale of 4 miles to the inch; a scale of degrees off course with a 60-mile radius, and a cut-out triangle with a length representative of 30 sectional miles from base to apex and a width of 10° to either side of the center line at the base. In using the instrument for measuring direction of course, the instrument may be placed on the map, either centered on the mid-meridian M, as shown in Figure 3, or with either side of the instrument coinciding with the mid-meridian M, as in Figure 4. When the instrument is so placed, the center of the compass rose located at the inner end of the arm 12 coincides with the line of course at a point between the point of departure D and the destination D'. It is necessary for the exact center of the compass rose to coincide with the intersection of the mid-meridian and the drawn course line between the point of departure and the destination. It is only by having the center line in the tab that such coincidence can be secured, and it is not enough to align the center line of the compass and the apex of the triangle with the mid-meridian because the location of the instrument vertically along the mid-meridian must be exactly determined. This is accomplished by and only with the end of the center line on the arm 12 coinciding with the intersection of the course line and the mid-meridian. The direction of the course can then be read on the scale of the compass rose R. Also, as shown in Figure 5, the instrument may be used to measure the distance of a trip between the point of departure D and the destination D', by placing the instrument alongside the line of course and using the adjacent scale to provide distance marks along said line of travel, as at 14. Still further, the device may be used as shown in Figure 6 as an aid in construction of lines for estimation of drift. In this use, the instrument is centered on the course or line of travel and the scale 10a is utilized to mark the degrees on a line 15 drawn at right angles to and across the line of travel by using the adjacent end of the instrument as a straight edge. The scale thus used will be that for estimation of drift 60 miles from the point of departure. The same use can be performed by the use of opening 9 and scale 10 when the estimation of drift is desired at a point 30 miles out from the point of departure. The instrument may be used for measuring an angle of true course, in which case the instrument is centered on the mid-meridian and the instrument is slid up or down until the center line of the arm 12 coincides with the intersection of the mid-meridian and the course line. When this is done, the true course is read on the graduations 14' of slot 13. In addition, the instrument may be used for constructing drift guide, in which case the apex of the triangle 9 is placed at the point of departure and the triangle is then traced on the chart, marks being made for the 5° and 10° angles indicated by the scale 10. The length of opening 9 is such as to correspond with 30 miles on a given aeronautical chart, so that the 5° and 10° marks are made at a point 30 miles from the point of departure. By moving the instrument upwardly along the course line, the arrows on the sides of the triangular opening 9 at $a$ will coincide with the point of departure. As the distance between the arrows $a$ and the end of the instrument provided with the graduations 10a represents a given distance on the given aeronautical chart, the graduations 10a may be used for determining drift at a given number of miles from the point of departure.

From the foregoing description, it is believed that the construction, advantages and manner of use of the present instrument will be readily understood and appreciated by those skilled in the art.

What I claim is:

1. A navigation instrument of the character described comprising a stiff oblong sheet of material provided near one end with a fixed compass rose and formed with a relatively large opening of circular form concentric with the graduations of said compass rose, said sheet having an integral arm projecting inwardly from the inner edge of the compass rose and terminating at the center of said opening, said arm being parallel with the longitudinal axis of the sheet and having its longitudinal axis in radial alignment with the zero line of said compass rose.

2. The construction defined in claim 1, wherein said sheet further has an arcuate slot therein concentric with and adjacent the graduations of the compass rose and between the latter and said one end of the sheet, the longitudinal center of said arcuate slot being aligned with the zero line of the compass rose, and graduations on the sheet along one curved edge of said arcuate slot.

JEWELL LANE BORIFF.

REFERENCES CITED

The following references are of record in the file of this patent:

UNITED STATES PATENTS

| Number | Name | Date |
|---|---|---|
| 1,619,427 | McCaffery | Mar. 1, 1927 |
| 2,016,489 | Escalante | Oct. 8, 1935 |
| 1,708,551 | Nell | Apr. 9, 1929 |
| 1,808,705 | Owen | June 2, 1931 |
| 1,102,689 | Sargent | July 7, 1914 |
| 1,354,977 | Karnmeyer | Oct. 5, 1920 |
| 564,549 | Ayres | July 21, 1896 |
| 1,665,898 | Strickland | Apr. 10, 1928 |
| 1,803,200 | Moore | Apr. 28, 1931 |